US005969709A

United States Patent [19]

Kim

[11] Patent Number: 5,969,709

[45] Date of Patent: Oct. 19, 1999

[54] FIELD EMISSION DISPLAY DRIVER

[75] Inventor: Jung-Woo Kim, Yongin-gun, Rep. of Korea

[73] Assignee: Samsung Electronics Co., Ltd., Suwon, Rep. of Korea

[21] Appl. No.: 09/005,228

[22] Filed: Jan. 9, 1998

Related U.S. Application Data

[63] Continuation-in-part of application No. 08/472,974, Jun. 7, 1995, abandoned.

[30] Foreign Application Priority Data

Feb. 6, 1995 [KR] Rep. of Korea ........................ 95-2076

[51] Int. Cl.[6] ................................ G09G 5/10; H04N 5/57

[52] U.S. Cl. ............................ 345/147; 345/74; 348/615; 348/687

[58] Field of Search .................................... 348/655–658, 348/673–674, 615–617, 687, 657, 191; 345/147, 74, 207, 20, 77

[56] References Cited

U.S. PATENT DOCUMENTS

| | | | |
|---|---|---|---|
| 4,415,921 | 11/1983 | Mulvanny et al. | 348/687 |
| 4,706,108 | 11/1987 | Kumagai et al. | 348/178 |
| 4,723,158 | 2/1988 | White | 348/657 |
| 4,868,668 | 9/1989 | Tavernetti | 348/745 |
| 4,930,004 | 5/1990 | Yamamoto et al. | 348/658 |
| 5,181,103 | 1/1993 | Aoyama Tatsuya | 348/658 |
| 5,231,481 | 7/1993 | Eouzan et al. | 348/658 |

*Primary Examiner*—Lun-Yi Lao
*Attorney, Agent, or Firm*—Pillsbury Madison & Sutro LLP

[57] ABSTRACT

A field emission display (FED) driver sequentially provided with an amplifier for amplifying an input video signal, a sample-and-hold circuit for sampling and holding the amplified video signal, a display having a plurality of pixels for displaying the signal sampled by the sample-and-hold circuit, and a biasing power source causing a field emission to the display, for generating an image, the FED driver includes a detector for detecting a current change of the respective pixels of the display, an analog-to-digital (A/D) converter connected to the output of the detector for converting the output signal of the detector into a digital signal, a memory device wherein the information which is a basis for the luminescence characteristics of the respective pixels is stored, a subtracter for receiving and differentiating the output signal of the A/D converter and the signal supplied from the memory device, a luminescence processor for obtaining the luminescence characteristics of the respective pixels supplied from the subtracter and storing the same, and an adder for adding the digitized video signal to the signal output from the luminescence processor. Therefore, the luminescence characteristics of pixels are improved and a high picture quality can be obtained.

6 Claims, 3 Drawing Sheets

FIELD EMISSION DISPLAY DRIVER

This is a Continuation-in-Part of: National appln. Ser. No. 08/472,974 filed Jun. 7, 1995, now abandoned.

BACKGROUND OF THE INVENTION

The present invention relates to a field emission display (FED) driver, and more particularly, to a field emission display (FED) driver which has a constant pixel luminescence characteristic throughout a display.

Generally, flat panel displays adopt a matrix driving method according to their structural characteristics, and an amplitude modulation method or a pulse width modulation method is used for a gray scale implementation.

A field emission display (FED) uses both modulation methods. However, since the pulse width modulation method has a limit in implementing a gray scale, the amplitude modulation method is mainly used.

FIGS. 1A and 1B are circuit diagrams of a conventional FED driver, in which FIG. 1A shows an FED driver adopting an amplitude modulation method, and FIG. 1B shows an FED driver adopting a pulse width modulation method.

Referring to FIG. 1A, an input video signal is radiated onto the respective pixels of a display 7 constituted by an FED via an amplifer 3 for amplifying a video signal and a sample-and-hold circuit 5 for sampling according to a sampling rate and storing (holding) the sampled information to display the video signal amplified by the amplifier 3, thereby generating an image. In the FED driver shown in FIG. 1A, a biasing power source 9 creating a field emission is serially connected to ground.

As described above, an FED driver circuit which uses the amplitude modulation method is complicated, and does not have a standard integrated circuit. In addition, although the characteristic of each pixel may be different and a defective pixel may be generated, a compensating circuit is not provided.

Referring to FIG. 1B, an input video signal is converted into a digital signal by an analog-to-digital (A/D) converter 13. The digital signal is radiated into the respective pixels of a display 17 constituted by an FED via a pulse width modulator 15, thereby generating an image. However, since the pulse width modulation method is limited in the gray scale it can implement, the FED driver adopting this method shown in FIG. 1B cannot satisfy a delicate scale implementation, displaying an image with the delicate pixel differences and inherent characteristics of each pixel, similar to the FED driver adopting the amplitude modulation method. Also, since the compensation of a defective pixel is not performed, the circuit life is shortened.

SUMMARY OF THE INVENTION

To solve the aforementioned problems, it is an object of the present invention to provide a circuit for summing and compensating an input video signal by feeding back information regarding characteristics of the respective pixels of a display, and radiating the video signal into the respective pixels for an improved picture quality and long circuit life.

To accomplish the above object, a field emission display (FED) driver according to the present invention is sequentially provided with an amplifier for amplifying an input video signal. A sample-and-hold circuit samples and holds the amplified video signal. A display having a plurality of pixels displays the signal sampled by the sample-and-hold circuit; and a biasing power source causes a field emission to the display, for generating an image; The FED driver comprises: a detector for detecting a current change for the respective pixels of the display; an analog-to-digital (A/D) converter connected to the output of the detector for converting the output signal of the detector into a digital signal; a memory device for storing the information which is a basis for the luminescence characteristics of the respective pixels, a subtracter for receiving and differentiating the output signal of the A/D converter and the signal supplied from the memory device; a luminescence processor for obtaining the luminescence characteristics of the respective pixels supplied from the subtracter and storing the same; and an adder for adding the digitized video signal to the signal output from the luminescence processor.

According to the present invention, since a video signal is compensated by a feedback circuit, the luminescence characteristics of pixels are improved and a high picture quality can be obtained.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In the present invention, a video signal is radiated onto each pixel of a display using an amplitude modulation method.

Figure 1A:
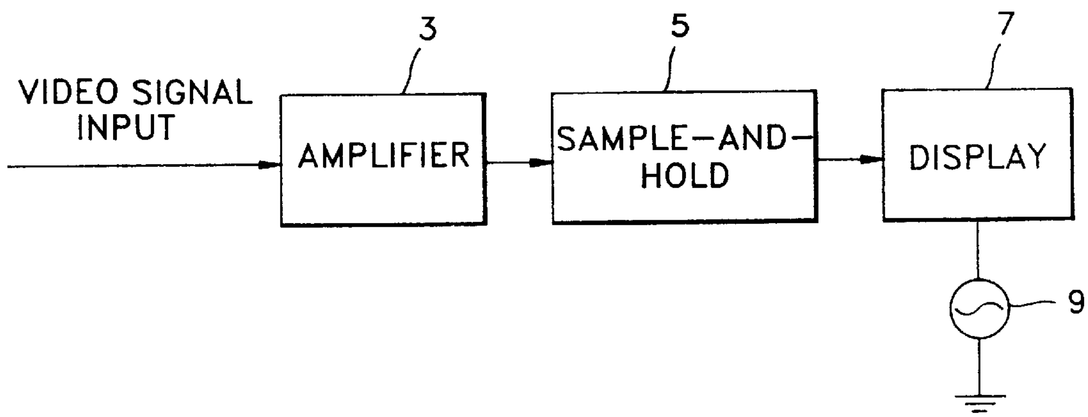
FIGS. 1A and 1B are circuit diagrams of a conventional field emission display driver.
Figure 1B:
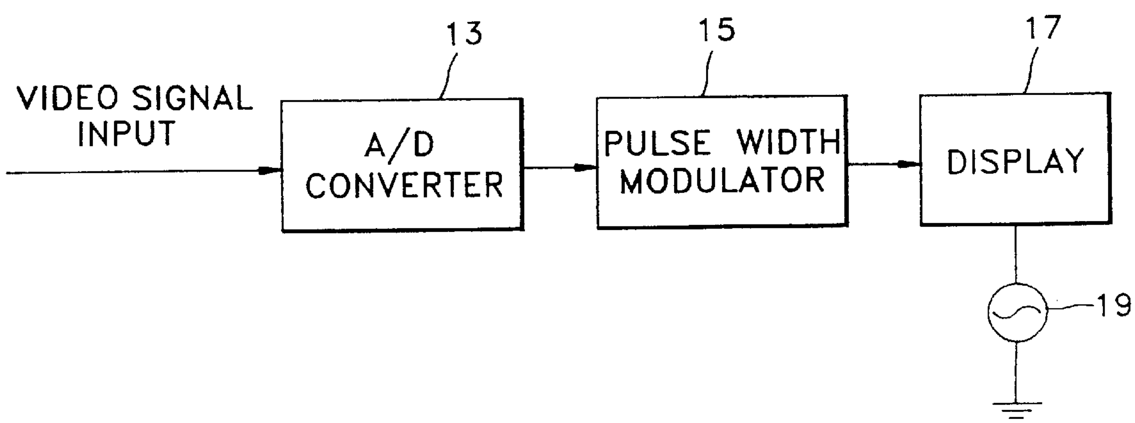
Figure 2:
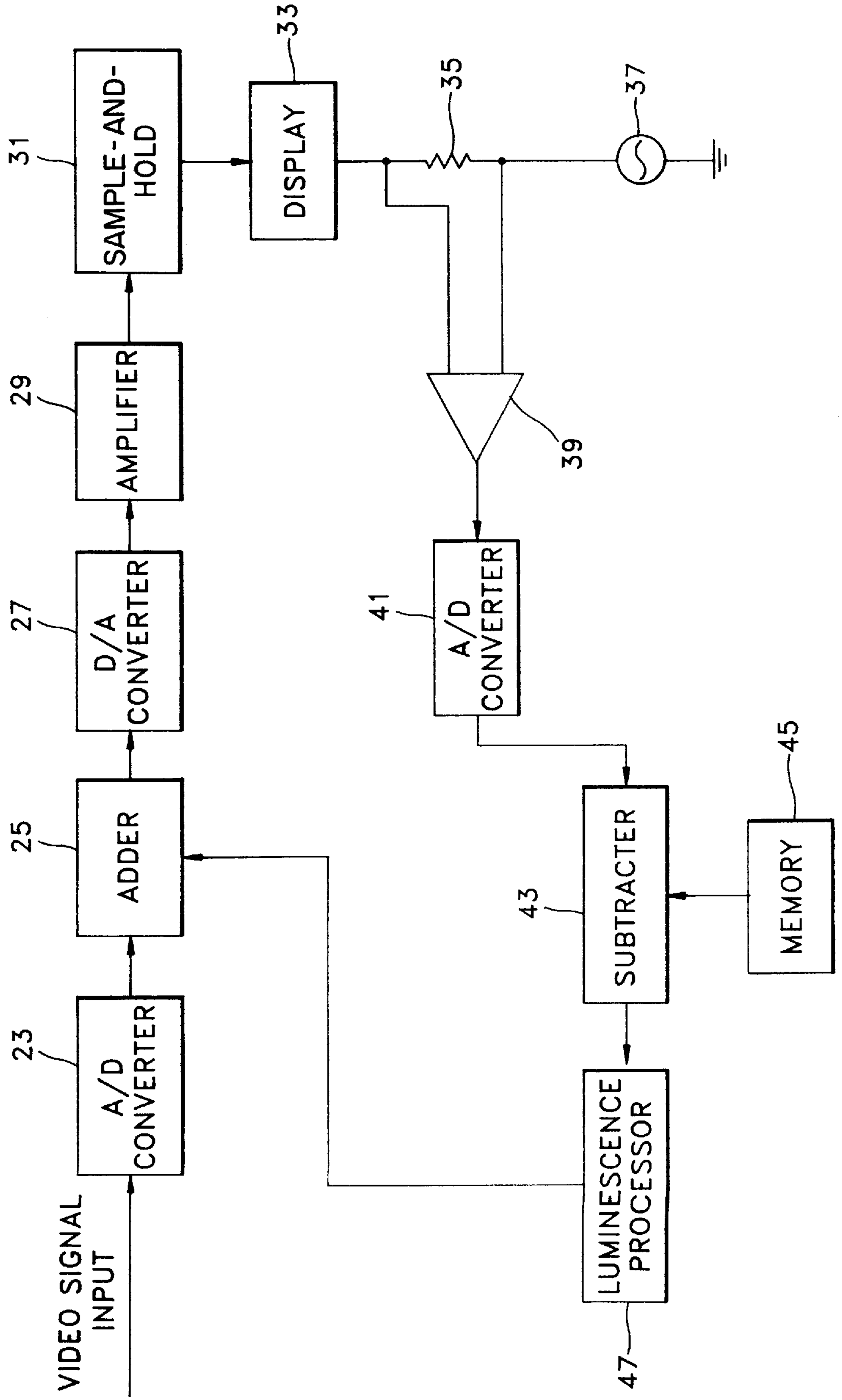
FIG. 2 is a circuit diagram of a field emission display driver according to an embodiment of the present invention.

Referring to FIG. 2, there are sequentially provided an amplifier 29 for amplifying an input video signal, a sample-and-hold circuit 31 for sampling the amplified video signal according to a sampling rate and storing the sampled signal, and a display 33. Also, a biasing power source 37 is serially connected between the display 33 and ground, to thus create a field emission.

In order to improve pixel characteristics, between the biasing power source 37 and amplifier 29, there is further provided a feedback loop.

The feedback loop is a loop for detecting current variations of the respective pixels of a display 33 and compensating the luminescence characteristics of the respective pixels. For this purpose, there is provided a resistance device 35 between the display 33 and biasing power source 37. The current variation of the respective pixels is detected by the potential difference across the resistance device 35.

The feedback loop includes: a differential amplifier 39 for differentially amplifying the voltages across the resistance device; an A/D converter 41 for converting the signal of the differential amplifier 39 into a digital signal; a memory 45 for storing luminescence data which is a basis of the respective pixels; a subtracter 43 for determining a difference between the signal output from the A/D converter 41 and a signal supplied from the memory 45, and a luminescence processor 47 for obtaining the luminescence characterstics of the respective signals output from the subtracter 43. The initial value of current flowing along each pixel is stored in the memory 45. The substracter 43 compares the current value stored in the memory 45 with the current value changed by th degradation to calculate deviation therebetween. The luminance processor 47 compensates luminance of each pixel through a real time processing by reflecting the current deviation of each pixel.

The luminescence processor 47 includes an input buffer, a memory and an operator. In the memory of the luminescence processor 47, a gamma correction program for compensating difference between a real gray scale of the current value and a visual gray scale thereof, and a program for compensating input image signals according to the characteristics of the FED device are stored. The signal output from the substracter 43 is input to the input buffer of the luminescence processor 47. The value input to the input buffer and the value stored in the memory of the luminescence processor 47 are compared by the operator to be compensated and then the result is output. Also, an adder 25 is provided upstream of amplifier 29, which receives as its input an input video signal, and the signal supplied from the luminescence processor 47. Adder 25 adds the input signals to form a compensated video signal which it then transmits to the amplifier 29.

In this case, the signal supplied from the luminescence processor 47 is a digital signal, and the input video signal is an analog signal. However, the type of the signal input to the adder 25 should be matched with that of the signal supplied from the luminescence processor 47. Thus, an A/D converter 23 for converting the input video signal into a digital signal is provided at one port of the adder 25.

Also, a D/A converter 27 for converting the signal input to the amplifier 29 into an analog signal is provided between the adder 25 and amplifier 29.

The resistance device 35 and differential amplifier 39 are replaceable by a detector for detecting the luminescence variation of the respective pixels of the display 33. The resistance device 35 and differential amplifier 39 do not have to be positioned in series between the display 33 and biasing power source 37.

Figure 3:
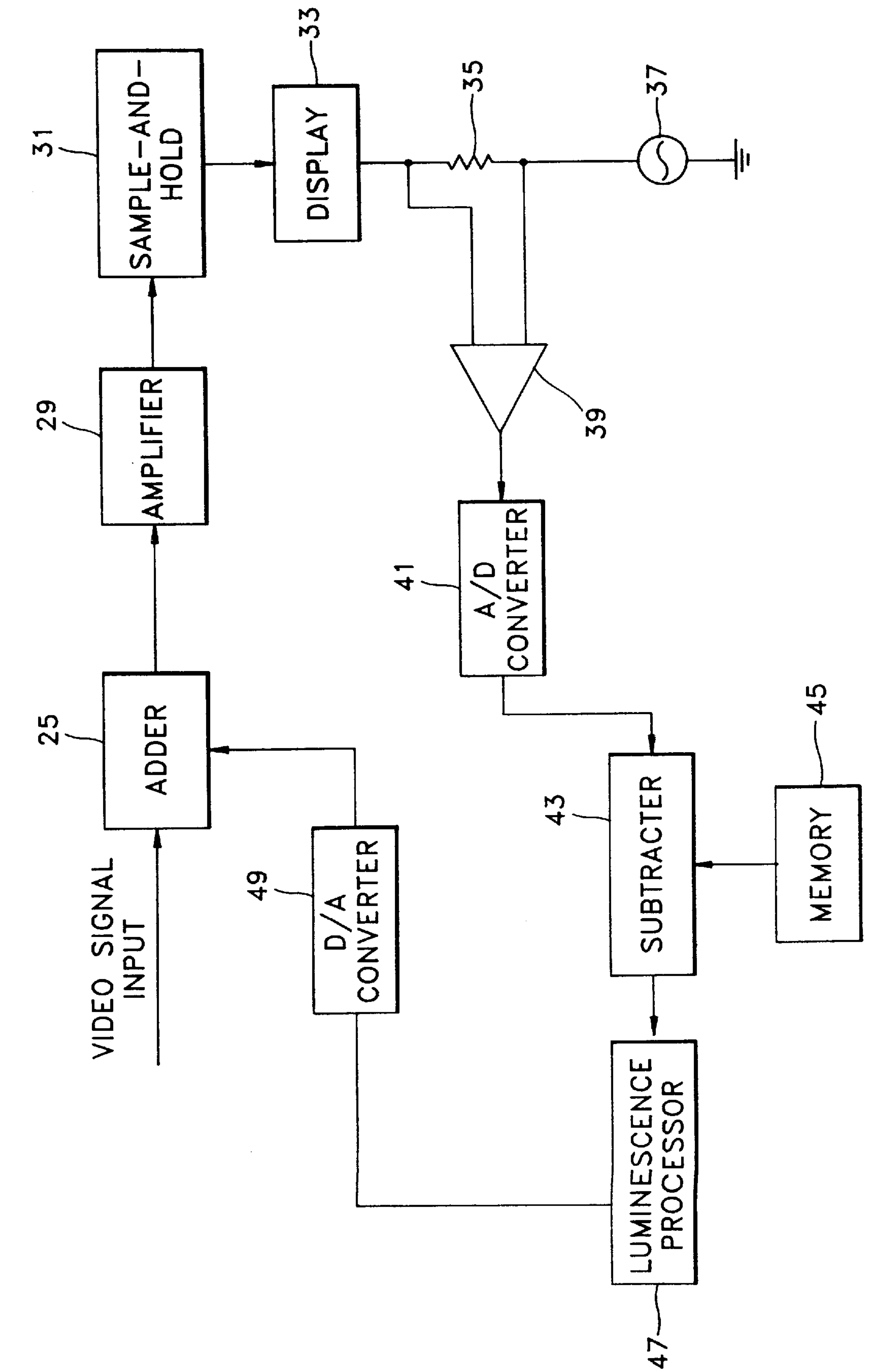
FIG. 3 is a circuit diagram of a field emission display driver according to another embodiment of the present invention.

FIG. 3 is a circuit diagram of an FED driver according to another embodiment of the present invention. The illustrated circuit is the same as that of FIG. 2 except that the converters for mutually converting an analog signal and a digital signal are positioned differently. In order to match the type of the video signal with that of the signal transmitted from the luminescence processor 47, a D/A converter 49 is provided between the adder 25 and luminescence processor 47.

In this manner, by placing D/A converter 49 between adder 25 and luminescence processor 47, an A/D converter is not necessary, thereby reducing the total number of components.

With the field emission display driver according to the present invention, as described above a video signal is compensated through a feedback circuit, thereby improving the pixel luminescence characteristics and facilitating the production of a high quality image.

What is claimed is:

1. A field emission display (FED) driver comprising:

an amplifier for amplifying an input video signal;

a sample-and-hold circuit for sampling and holding the amplified video signal;

a display having a plurality of pixels for displaying the signal sampled by the sample-and-hold circuit;

a biasing power source causing a field emission to the display and generating an image;

a detector for detecting a current change in respective pixels of said display;

an analog-to-digital (A/D) converter connected to an output of said detector for converting a signal output by said detector into a digital signal;

a memory device for storing and outputting information which is a basis for luminescence characteristics of said respective pixels of said display;

a subtracter for receiving and determining a difference between an output signal of said A/D converter and a signal supplied from said memory device;

luminescence processor for obtaining from said subtracter a difference signal representing luminescence characteristics of said respective pixels and storing said difference signal; and an adder for adding said input video signal to a signal output from said luminescence processor.

2. A field emission display (FED) driver as claimed in claim 1, further comprising a digital-to analog (D/A) converter provided between said adder and said luminescence processor for converting a signal output from said luminescence processor into an analog signal which matches the signal type of said input video signal.

3. A field emission display (FED) driver as claimed in claim 1, further comprising: an A/D converter provided at an input port of said adder for converting said input video signal into a digital signal which matches the signal type of a signal output from said luminescence processor; and a D/A converter provided between said adder and said amplifier for converting a digital signal supplied from said adder into an analog signal.

4. A field emission display (FED) driver as claimed in claim 1, wherein said detector comprises a resistive device provided between said respective pixels and said biasing power source and a potential differential amplifier for detecting and amplifying a voltage difference present across said resistive device.

5. A field emission display driver comprising:

an amplifier for amplifying an input video signal;

display means for displaying the amplified input video signal, said display means comprising a plurality of pixels;

a biasing power source for generating a field emission in said pixels of said display means and for generating an image;

a detector for detecting a current change in respective pixels of said display;

a memory device for storing and outputting information which is a basis for luminescence characteristics of said respective pixels of said display;

comparing means for receiving and comparing to each other an output signal of said detector and a signal supplied from said memory device;

a luminescence processor for obtaining from said comparing means a relative signal representing relative luminescence characteristics of said respective pixels, storing said relative signal, and forming a modifying video signal based upon said relative signal; and an adder for adding to said input video signal said modifying signal formed by said luminescence processor.

6. The field emission display according to claim 5, wherein said display means comprises a sample-and-hold circuit for sampling and holding the amplified video signal, said pixels displaying signals sampled and held by said sample-and-hold circuit.

* * * * *